(12) United States Patent
Huang

(10) Patent No.: US 9,695,909 B1
(45) Date of Patent: Jul. 4, 2017

(54) LEAF CHAIN

(71) Applicant: MING-CHANG TRAFFIC PARTS MANUFACTURING CO., LTD., Pingtung County (TW)

(72) Inventor: Yi-Cheng Huang, Pingtung County (TW)

(73) Assignee: Ming-Chang Traffic Parts Manufacturing Co., Ltd., Pingtung (TW)

( * ) Notice: Subject to any disclaimer, the term of this patent is extended or adjusted under 35 U.S.C. 154(b) by 0 days.

(21) Appl. No.: 14/988,015

(22) Filed: Jan. 5, 2016

(51) Int. Cl.
*F16G 13/02* (2006.01)
*F16G 13/06* (2006.01)
*F16G 13/08* (2006.01)

(52) U.S. Cl.
CPC ............ *F16G 13/06* (2013.01); *F16G 13/08* (2013.01)

(58) Field of Classification Search
CPC .......... F16G 13/06; F16G 13/04; F16G 13/08; B65G 17/38; B65G 2201/02
USPC ................... 474/206, 226, 231, 230
See application file for complete search history.

(56) References Cited

U.S. PATENT DOCUMENTS

| | | | | |
|---|---|---|---|---|
| 1,523,801 A * | 1/1925 | Coe | ........................ | B65G 17/38 198/687 |
| 1,842,117 A * | 1/1932 | Renshaw | ................... | B21L 9/00 285/222 |
| 2,816,453 A * | 12/1957 | Frank | ..................... | F16C 11/045 198/833 |
| 3,068,712 A * | 12/1962 | Kuntzmann | ............ | F16G 13/06 277/362 |
| 3,835,721 A * | 9/1974 | Hoffstetter | .............. | F16G 13/06 474/207 |
| 4,058,021 A * | 11/1977 | Wood | ..................... | B65G 17/08 474/157 |
| 4,094,515 A * | 6/1978 | Araya | ....................... | B21L 9/08 277/402 |
| 4,099,424 A * | 7/1978 | Pemberton | ............. | F16G 13/06 474/156 |
| 4,186,617 A * | 2/1980 | Avramidis | ............. | F16G 13/06 474/229 |
| 4,349,343 A * | 9/1982 | Stephanoff | ................ | F16G 5/18 474/245 |
| 4,464,151 A * | 8/1984 | Kahl | ....................... | F16G 13/06 474/228 |
| 4,494,945 A * | 1/1985 | Ogino | .................... | F16G 13/06 474/202 |

(Continued)

*Primary Examiner* — Henry Liu
(74) *Attorney, Agent, or Firm* — Rosenberg, Klein & Lee

(57) ABSTRACT

A leaf chain includes a plurality of chain units each having two pins, around which first and second alternate inner plates between outer plates are mounted. The plates form respective apertures where the pins penetrate. Each chain unit has bushings located in the apertures of the first and second inner plates, and first washers disposed between any two adjacent bushings and between the bushings and the outer plates. There are connecting plates located at an outer side of the outer plates and tightly engaged with the pins to prevent the outer plates from being deformed because of a concentration of large force in the outer plates during the transmission. The outer plates have a loose engagement with the pins to prevent the pins and inner plates from being worn away. The first washers help the sealing effect to maintain the preferable stability and transmissibility and prolong the operating life.

1 Claim, 5 Drawing Sheets

(56) References Cited

U.S. PATENT DOCUMENTS

| | | | | |
|---|---|---|---|---|
| 4,642,078 | A * | 2/1987 | Dupoyet | F16G 13/06 474/206 |
| 4,729,756 | A * | 3/1988 | Zimmer | F16G 13/06 474/214 |
| 4,795,408 | A * | 1/1989 | Kotegawa | F16G 13/06 384/138 |
| 4,932,927 | A * | 6/1990 | Fillar | B65G 17/38 474/207 |
| 5,092,822 | A * | 3/1992 | Wakabayashi | F16H 7/06 474/209 |
| 5,222,920 | A * | 6/1993 | Cheesman | F16G 13/06 474/213 |
| 5,269,729 | A * | 12/1993 | Thuerman | F16G 13/06 474/207 |
| 5,425,679 | A * | 6/1995 | Utz | F16H 57/04 277/399 |
| 6,321,523 | B1 * | 11/2001 | Christmas | B65G 17/24 198/851 |
| 6,393,820 | B1 * | 5/2002 | Varnam | B66F 9/08 474/212 |
| 6,782,688 | B2 * | 8/2004 | Garbagnati | B65G 17/38 474/207 |
| 7,059,985 | B2 * | 6/2006 | Markley | F16H 55/30 474/206 |
| 7,343,730 | B2 * | 3/2008 | Humcke | F16G 13/07 198/850 |
| 7,568,988 | B2 * | 8/2009 | Moore | B65G 17/38 474/206 |
| 7,972,234 | B2 * | 7/2011 | Sakamoto | F16G 13/04 474/212 |
| 8,602,931 | B2 * | 12/2013 | Fujiwara | B65G 17/38 277/353 |
| 8,622,858 | B2 * | 1/2014 | Huang | F16G 13/02 474/230 |
| 2002/0049107 | A1 * | 4/2002 | Ledvina | F16G 13/04 474/213 |
| 2002/0173396 | A1 * | 11/2002 | Markley | F16G 5/18 474/245 |
| 2003/0017896 | A1 * | 1/2003 | Markley | F16H 55/30 474/157 |
| 2004/0176201 | A1 * | 9/2004 | Mott | F16G 13/04 474/215 |
| 2007/0072719 | A1 * | 3/2007 | Sakamoto | F16G 13/04 474/212 |
| 2007/0155563 | A1 * | 7/2007 | Aoki | F16G 13/06 474/206 |
| 2008/0287238 | A1 * | 11/2008 | Morimoto | F16G 13/06 474/230 |
| 2011/0086736 | A1 * | 4/2011 | Huang | F16G 13/02 474/230 |
| 2012/0100946 | A1 * | 4/2012 | Kotera | F16G 13/18 474/206 |
| 2013/0150195 | A1 * | 6/2013 | Christmas | F16G 13/07 474/226 |

* cited by examiner

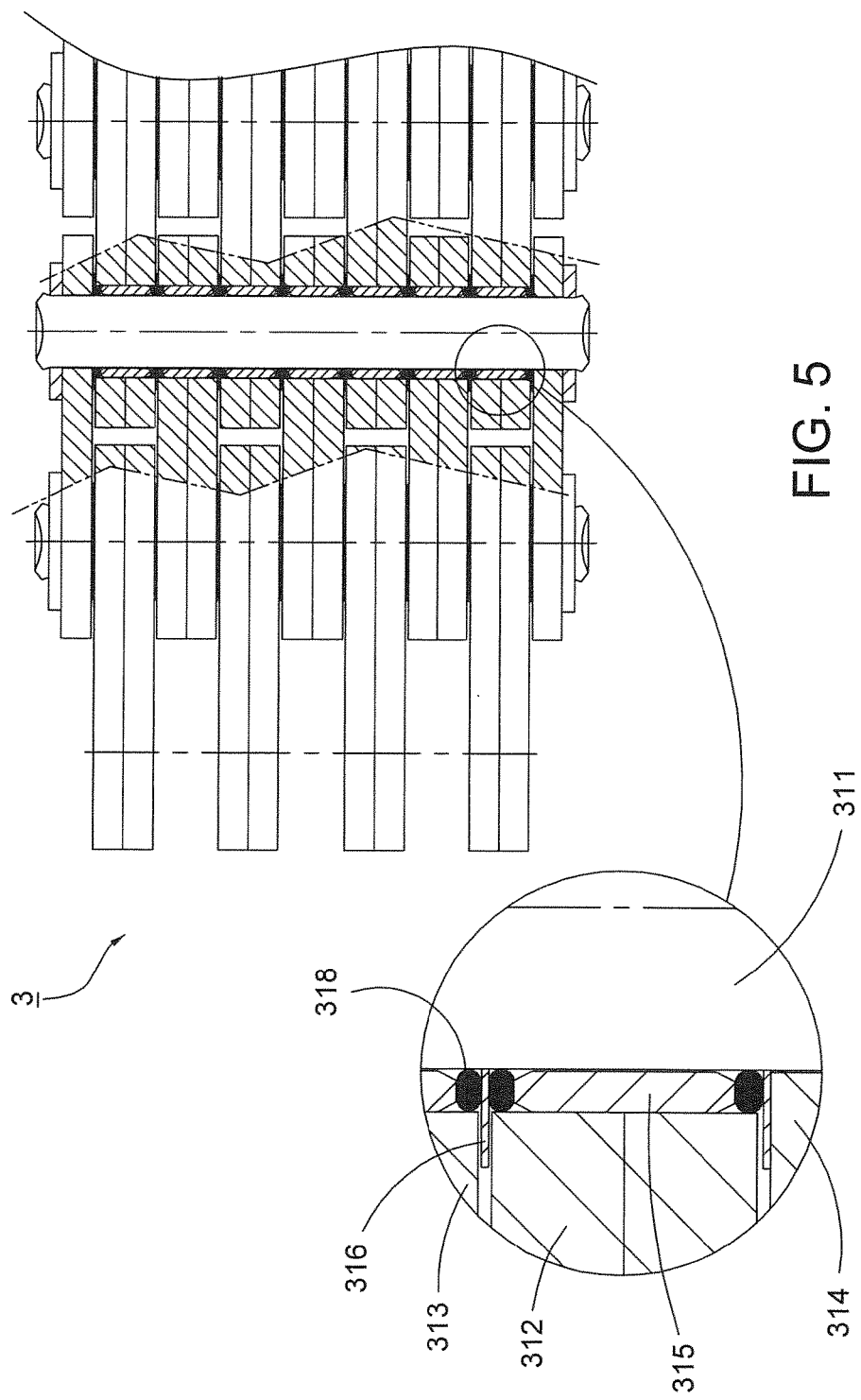

LEAF CHAIN

BACKGROUND OF THE INVENTION

1. Field of the Invention

This invention relates to a leaf chain and relates particularly to a leaf chain applied to a high-loading transmitting mechanism.

2. Description of the Related Art

A general chain is mainly designed for a purpose of the power transmission. The chain varies in types and structures to fit for different using fields.

A Leaf chain is applied to a mechanism for transmitting and hoisting heavy objects currently. Referring to FIG. 1 showing a conventional leaf chain 1 composes a plurality of connective chain units 11. Each chain unit 11 includes two aligned pins 12, at least two outer plates 15 disposed around the pins 12, a plurality of first inner plates 13 disposed around the pins 12 and located between the two outer plates 15, a plurality of second inner plates 14 disposed around the pins 12 and located between any two first inner plates 13, a plurality of bushings 17 mounted around the pins 12 and located in the first and second inner plates 13、14, and a plurality of washers 16 mounted around the pins 12 and located between the first and second inner plates 13、14 and between the first inner plates 13 and the outer plates 15. A plurality of first and second apertures 131、141 are respectively formed through the first inner plates 13 and the second inner plates 14. The bushings 17 are disposed between the first apertures 131 and the pins 12 and between the second apertures 141 and the pins 12. Each of the second inner plates 14 are located at a place corresponding to each of the outer plates 15. The outer plates 15 having a plurality of third apertures 151 are fixed tightly on the pins 12. The lubricant moistens a space between each pin 12 and each bushing 17 to prevent the pins 12 and the bushings 17 from being attrite and rusted during a transmitting process (not shown).

However, the disclosed leaf chain 1 still has problems. Because the outer plates 15 engage tightly with the pins 12, the large force concentrates on the outer plates 15 to cause the deformation of the outer plates 15 during the transmitting process. Meanwhile, when the leaf chain 1 rotates under a high-loading state, the pins 12 rotate abnormally because the twisting force is larger than the tight engagement between the outer plates 15 and the pins 12 to cause the outer plates 15 and the pins 12 to be worn away. Moreover, the outer plates 15 are even stretched and deformed to affect the operating life of the leaf chain 1.

Generally, the leaf chain 1 keeps operating in a specific transmitting direction and twisting angle. Besides, the outer plates 15 are fixed tightly with the pins 12. The pins 12, therefore, link with the outer plates 15. Thus, the attrite parts of the pins 12 and the bushings 17 are centered on the specific part of the pins 12 to cause the unequal contact of the pins 12 with the bushings 17. Gradually, the specific part of the pins 12 which takes the applied force is recessed and deformed to reduce the operating life of the leaf chain 1.

Moreover, the washers 16 are disposed between the first and second inner plates 13、14 and provide the sealing effect by being tightly disposed to the first inner plates 13 and the outer plates 15. However, the first inner plates 13, the second inner plates 14, and outer plates 15 respectively twist in the different angles to easily cause the attrition and damage of the washers 16 disposed between the first and second inner plates 13、14 and between the first inner plates 13 and the outer plates 15 to lose the lubricant.

SUMMARY OF THE INVENTION

The object of this invention is to provide a leaf chain capable of maintaining the preferable stability and transmissibility and extending the operating life of the leaf chain.

The leaf chain of this invention comprises a plurality of chain units lining to each other including two aligned pins, at least two outer plates disposed around the pins, a plurality of first inner plates disposed around the pins and located between the two outer plates, a plurality of second inner plates disposed around the pins and located between any two first inner plates, a plurality of bushings sleevedly disposed to the pins and located in the first and second inner plates, a plurality of first washers sleevedly disposed between any two abutting bushings and between the bushings and the outer plates, and a plurality of connecting plates disposed around the pins and located at the outside of the outer plates. The connecting plates are fixed tightly on the pins to prevent the applied force from concentrating on the outer plates to cause the outer plates being stretched and deformed during a transmitting process. Further, a plurality of third apertures is formed on the outer plates. The pins thread through the third apertures and engage loosely with the outer plates to provide a balanced contact between the pins with the outer plates, the first and second inner plates without wearing the specific part of the pins. Moreover, a disposed location of the first washers reduces the additional waste of the first washers to provide a longer operating life of the washers. Thus, the better sealing effect is offered, the preferable stability and transmissibility are maintained, and the operating life of the leaf chain is effectively prolonged.

Preferably, each of the chain units has a plurality of second washers. Each of the second washers is disposed between each of the bushings and each of the first washers.

BRIEF DESCRIPTION OF THE DRAWINGS

FIG. 5 is a cross-sectional view showing the second preferred embodiment of this invention.

DETAILED DESCRIPTION OF THE PREFERRED EMBODIMENTS

Before a detailed description of this invention, similar elements in the following description are represented by same numbers.

Figure 1:
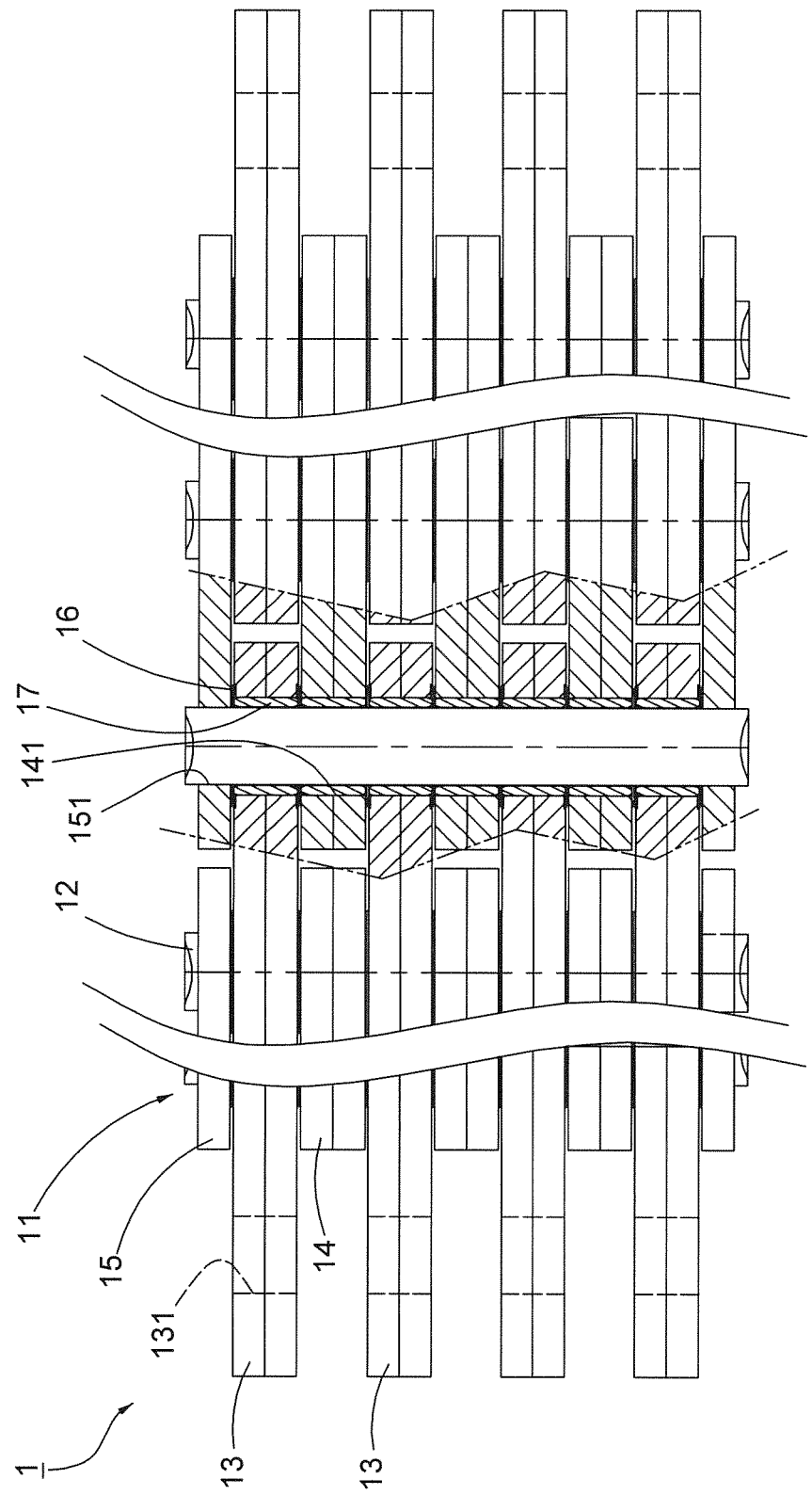
FIG. 1 is a cross-sectional view showing a conventional leaf chain.
Figure 2:
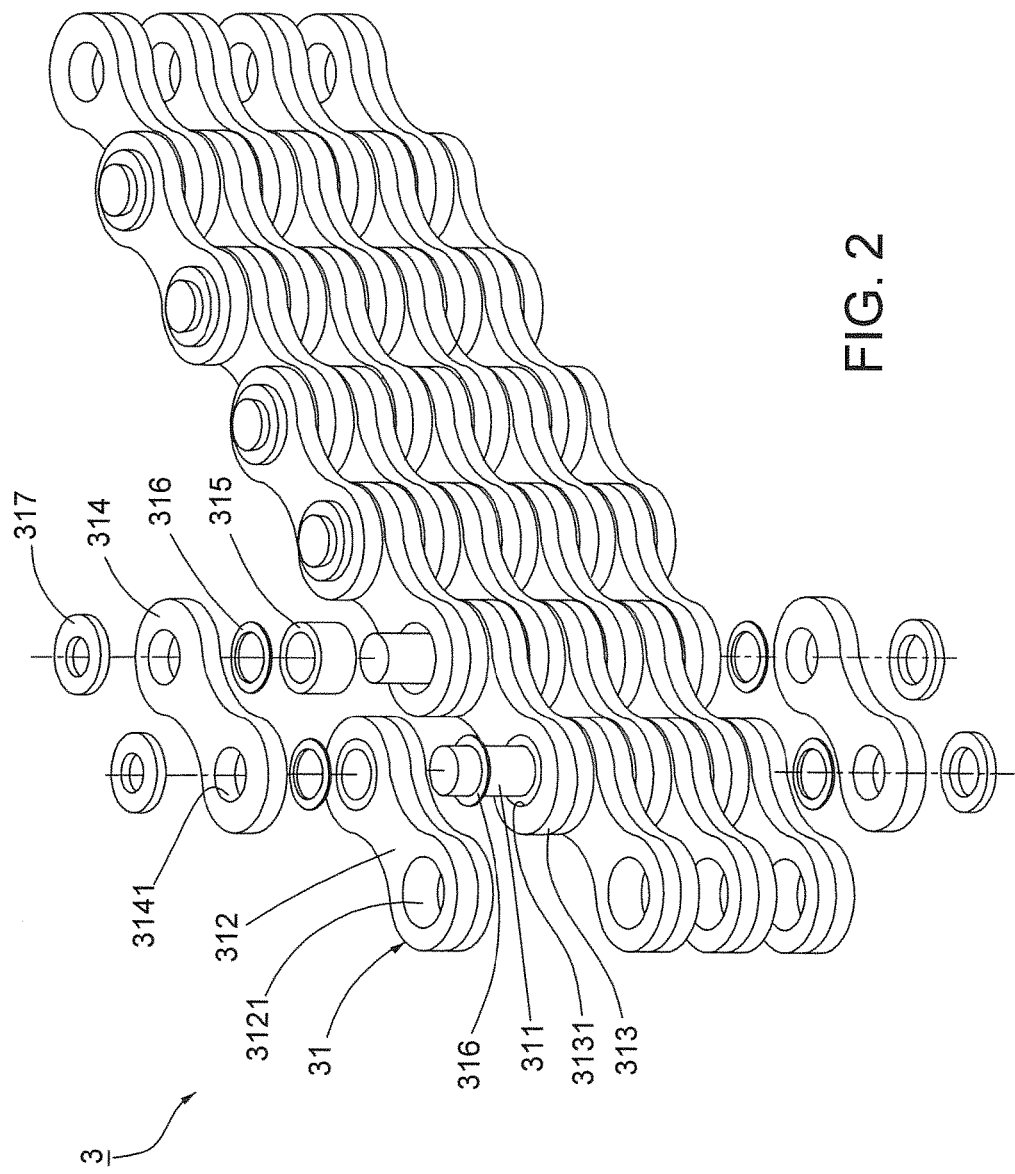
FIG. 2 is an exploded view showing a first preferred embodiment of this invention.
Figure 3:
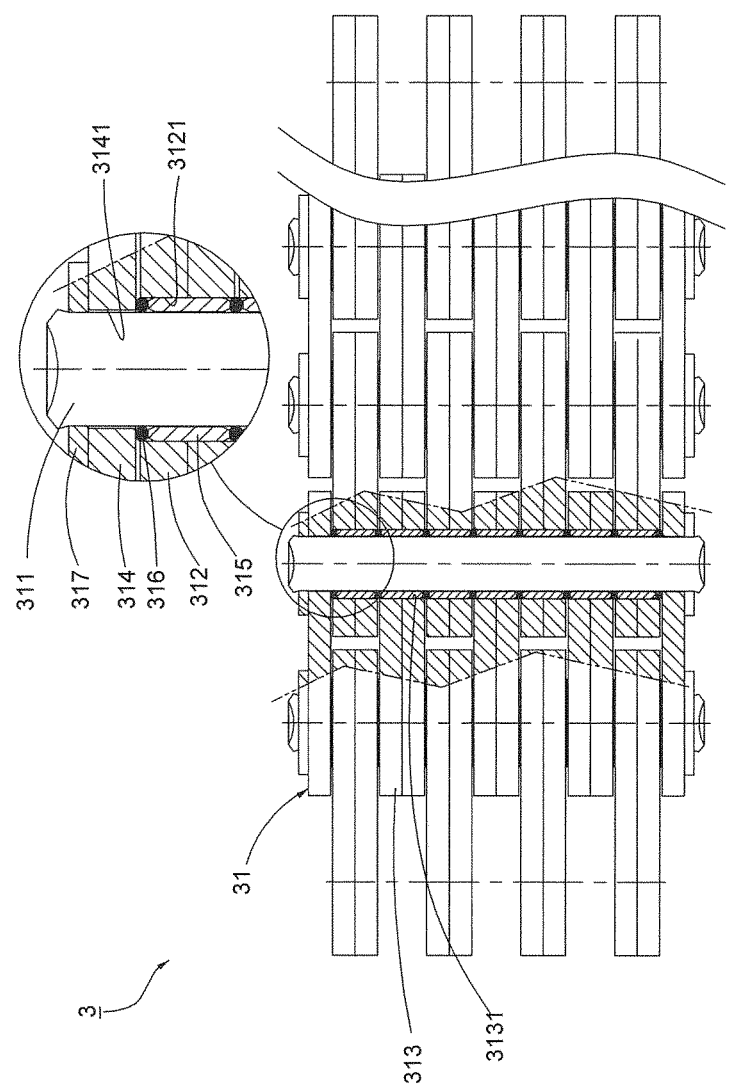
FIG. 3 is a cross-sectional view showing a first preferred embodiment of this invention.

Referring to FIG. 2 and FIG. 3 showing a first preferred embodiment of a leaf chain 3 of this invention includes a plurality of chain units 31 coupled to each other. Each of the chain units 31 has two aligned pins 311, at least two outer plates 314 installed around the pins 311, a plurality of first inner plates 312 installed around the pins 311 and formed between the outer plates 314, a plurality of second inner plates 313 installed around the pins 311 and situated between any two adjacent first inner plates 312, a plurality of bushings 315 mounted on the pins 311 and situated between the first and second inner plates 312、313, a plurality of first washers 316 mounted on the pins 311 between any two abutting bushings 315 and between the bushings 315 and the outer plates 314, and a plurality of connecting plates 317 installed around the pins 311 and situated at the outside of the outer plates 314. Further, a plurality of first, second, and third apertures 3121、3131、3141 are respectively formed through the first inner plates 312, the second inner plates 313, and the outer plates 314 in order that the pins 311 can thread through the first and second inner plates 312、313 and the outer plates 314. Each of the second inner plates 313 is located at a place corresponding to each of the outer plates 314.

The connecting plates 317 are fixed on the pins 311 tightly to link the connecting plates 317 with the pins 311. The outer plates 314 are pivotally connected to the pins 311 to provide a loose engagement therebetween. Further, the first washers 316 are sleevedly disposed to the pins 311 between any two bushings 315 and between the bushings 315 and the outer plates 314 to seal any two adjacent bushings 317 and the bushings 317 with the outer plates 314. Meanwhile, the lubricant is applied to provide the lubricative effect between each bushing 315 and each pin 311 (not shown).

Referring to FIG. 2 and FIG. 3, the leaf chain 3 of this invention is applied to the loading transmission. Two ends of the leaf chain 3 are respectively connected to a linking unit such as a tractor (not shown) and an imparting unit such as a loading object (not shown) to transmit the power. During the transmitting process, the leaf chain 3 takes advantages that the connecting plates 317 located at the outside of the outer plates 314 engage tightly with the pins 311 and the outer plates 314 pivotally connect to the pins 311 and provide the loose engagement to balance and transmit the applied force through the outer plates 314 and the bushings 315 of the first and second inner plates 312、313 to act on the pins 311. Further, the applied force is transmitted equally to the outer plates 314 and the bushings 315 of the first second inner plates 312、313 of another chain unit 31 through the pins 311 to prevent the applied force from centering on the outer plates 314 and effectively avoid the deformation of the outer plates 314. Furthermore, the outer plates 314 of this invention are pivotally disposed to the pins 311. Therefore, the pins 311 of this invention which are different from the conventional leaf chain 1 are not limited to a single rotative angle during the transmitting process. Thus, the pins 311 can contact with the outer plates 314, the first and second inner plates 312、313 equally to prevent the pins 311 from being attrite at the specific part of the pins 311, thereby prolonging the operating life of the pins 311.

The first washers 316 are disposed tightly between any two bushings 315 and between the bushings 315 and the outer plates 314 to provide the sealing effect between the bushings 315 and the outer plates 314 to store the lubricant between the bushings 315 and the pins 311. Further, the first washers 316 of this invention are unlike the conventional washers 16 which are disposed fixedly between the first inner plates 13 and the second inner plates 14 to attain the sealing effect. The first washers 316 of this invention achieve the sealing effect by being disposed tightly between any two bushings 315 and between the bushings 315 and the outer plates 314. Although the first washers 316 still simultaneously contact with the first and second inner plates 312、313 and with the first inner plates 312 and the outer plates 314, it is merely to define positions of the first washers 316. Thus, the attrition of the first washers 316 caused by the different twisting direction among the first inner plates 312, the second inner plates 313, and the outer plates 314 during the transmitting process is prevented to extend the operating life of the first washers 316 and keep the preferable lubricative effect of the leaf chain 3. Therefore, the leaf chain 3 of this invention maintains the better stability and transmissibility and effectively prolongs the operating life.

Figure 4:
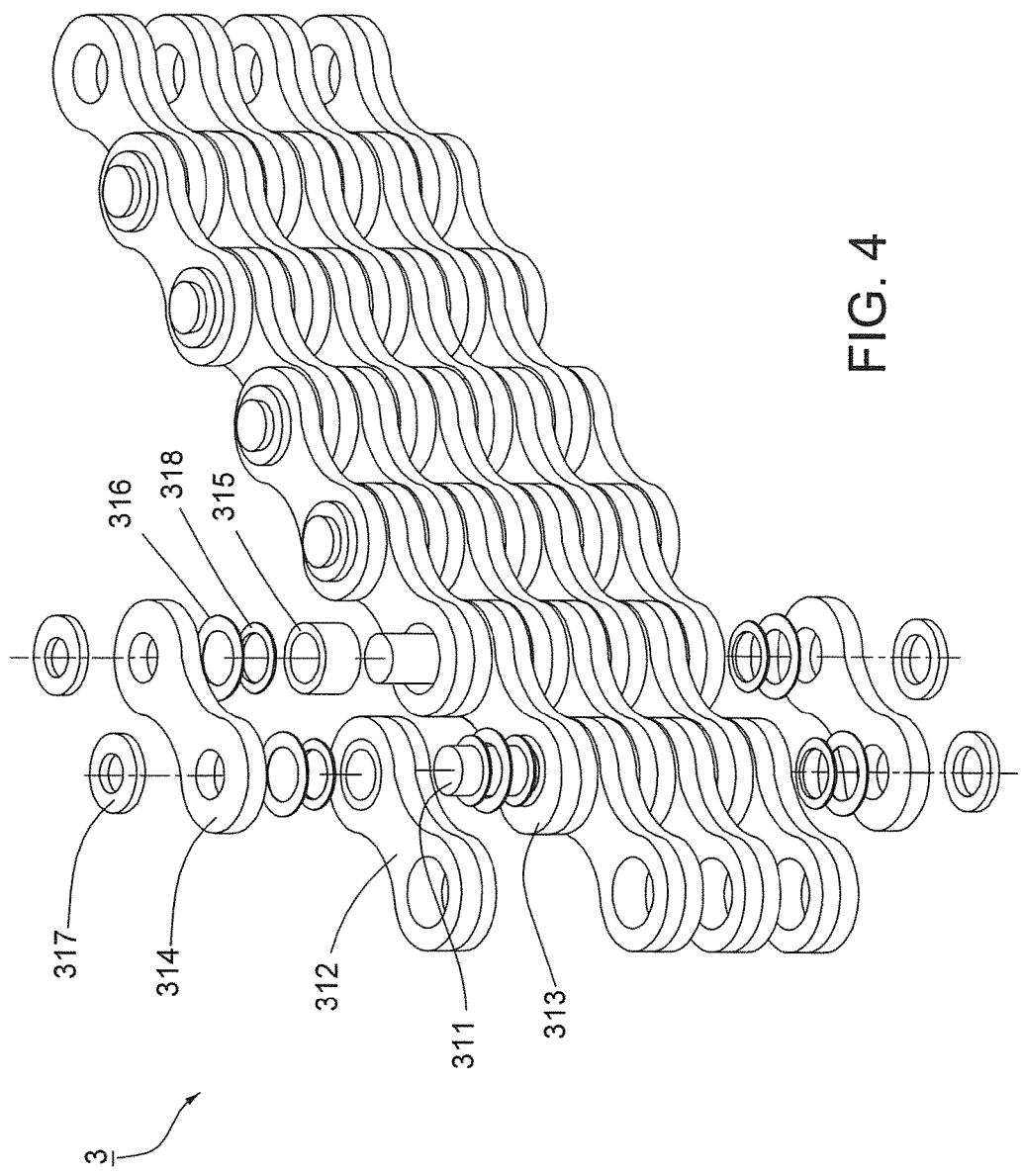
FIG. 4 is an exploded view showing a second preferred embodiment of this invention.

Referring to FIG. 4 and FIG. 5 showing a second preferred embodiment of this invention include the same correlated elements, the concatenation of elements, and the operation and objectives as those of the first preferred embodiment. This embodiment is characterised in that a plurality of second washers 318 can be disposed between the bushings 315 and the first washers 316. Therefore, the first washers 316 do not come into contact with the first and second inner plates 312、313 by the second washers 318. The second washers 318 do not simultaneously contact with the bushings 315 located between the first inner plates 312 and the pins 311 and the bushings 315 located between the second inner plates 313 and the pins 311. Further, the second washers 318 are incapable of being contacted the bushings 315 which are installed between the first inner plates 312 and the pins 311 and the outer plates 314 at the same time to effectively reduce the attrition of the leaf chain 3 during the transmitting process, extend the operating life of the first and second washers 316、318, and keep the preferable lubricative effect of the leaf chain 3. Thus, the better stability and transmissibility are maintained and the operating life of the leaf chain 3 is prolonged.

To sum up, the leaf chain of this invention takes advantages of the tight engagement between the connecting plates and the pins to prevent the applied force from being centered on the outer plates during the transmitting process and cause the deformation of the outer plates. Meanwhile, the outer plates are pivotally disposed to the pins to equalize the contact of the pins with the outer plates, the first and second inner plates without wearing the specific part of the pins because of the limited rotative angle. Further, the disposed locations of the first washers, the bushings, and the second washers which are preferably situated between the bushings and the first washers reduce the attrition of the first and second washers to ensure the better sealing effect, maintain the preferable stability and transmissibility, and effectively extend the operating life of the leaf chain.

While the embodiments of this invention are shown and described, it is understood that further variations and modifications may be made without departing from the scope of this invention.

What is claimed is:
1. A leaf chain comprising:
a plurality of chain units connected to each other,
each of said plurality of chain units having two aligned pins, at least two outer plates mounted around said two pins, a plurality of first inner plates mounted around said pins and disposed between said two outer plates, a plurality of second inner plates mounted around said pins and located between any two adjacent first inner plates, a plurality of bushings sleeved on said pins and located in said plurality of first and second inner plates, and a plurality of first washers sleeved on said pins between any two adjacent bushings and between said bushings and said outer plates to provide sealing effect, said outer plates and said plurality of second inner plates being in alignment,
each of said plurality of first and second inner plates having respective first and second apertures formed therethrough, each of said outer plates having third apertures formed through, said pins penetrating therethrough said first, second and third apertures, said plurality of bushings being respectively mounted in said first and second apertures of said plurality of first and second inner plates, wherein each of said plurality of chain units has a plurality of connecting plates mounted around said pins and located at an outer side of said two outer plates, said plurality of connecting plates having a tight engagement with said pins to link said connecting plates with said pins, said outer plates being pivotally connected to said pins to provide a loose engagement therebetween; and wherein each of said plurality of chain units has a plurality of second washers, each of which being disposed between each of said bushings and each of said first washers.

\* \* \* \* \*